(12) United States Patent
Bae et al.

(10) Patent No.: US 11,980,867 B2
(45) Date of Patent: May 14, 2024

(54) ADSORBENT FOR SKIN AGING DIAGNOSIS BASED ON BODY ODOR VOLATILE MARKER AND METHOD FOR PREPARING SAME

(71) Applicant: SEOUL WOMEN'S UNIVERSITY INDUSTRY-UNIVERSITY COOPERATION FOUNDATION, Seoul (KR)

(72) Inventors: Sun Young Bae, Yongin-si (KR); Se Hyun Kim, Seongnam-si (KR)

(73) Assignee: SEOUL WOMEN'S UNIVERSITY INDUSTRY-UNIVERSITY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/503,247

(22) Filed: Nov. 7, 2023

(65) Prior Publication Data

US 2024/0066498 A1    Feb. 29, 2024

Related U.S. Application Data

(63) Continuation of application No. PCT/KR2021/011183, filed on Aug. 23, 2021.

(30) Foreign Application Priority Data

May 13, 2021  (KR) .................. 10-2021-0061725
Aug. 20, 2021  (KR) .................. 10-2021-0110179

(51) Int. Cl.

| | | |
|---|---|---|
| *B01J 20/26* | (2006.01) | |
| *B01J 20/02* | (2006.01) | |
| *B01J 20/22* | (2006.01) | |
| *B01J 20/32* | (2006.01) | |
| *C08G 73/02* | (2006.01) | |
| *H01G 11/36* | (2013.01) | |

(52) U.S. Cl.
CPC .............. *B01J 20/26* (2013.01); *B01J 20/02* (2013.01); *B01J 20/226* (2013.01); *B01J 20/32* (2013.01); *C08G 73/0266* (2013.01); *H01G 11/36* (2013.01)

(58) Field of Classification Search
CPC ... B01J 20/02; B01J 20/32; B01J 20/22; B01J 20/26; B01J 20/226; B01J 20/28; B01J 20/205; B01J 20/3085; C08L 79/02; C08G 73/0266; H01G 11/36; C08K 3/042; C09D 179/02; G01N 1/40; G01N 1/30; G01N 30/06; G01N 30/72

USPC ......................... 502/401, 402, 400
See application file for complete search history.

(56) References Cited

U.S. PATENT DOCUMENTS

2014/0098461 A1*  4/2014  Zhamu .................. H01G 11/36
977/734

FOREIGN PATENT DOCUMENTS

| CN | 109021798 | * 12/2018 | |
|---|---|---|---|
| CN | 109021798 A | * 12/2018 | ......... C08G 73/0266 |
| KR | 10-1430397 B1 | 8/2014 | |
| KR | 10-2015-0020334 A | 2/2015 | |
| KR | 10-2018-0065493 A | 6/2018 | |

OTHER PUBLICATIONS

Li, Y. et al. Graphene/polyaniline electrodeposited needle trap device for the determination of volatile organic compounds in human exhaled breath vapor and A549 cell. RSC advances. 2017, vol. 7, No. 20, pp. 11959-11968.
Zeng, J. et al. Controllable transformation of aligned ZnO nanorods to ZIF-8 as solid-phase microextraction coatings with tunable porosity, polarity, and conductivity. Analytical chemistry. 2019, vol. 91, No. 8, pp. 5091-5097.
Wu, H. et al. A new ZnO/rGO/polyaniline ternary nanocomposite as photocatalyst with improved photocatalytic activity. Materials Research Bulletin. 2016, vol. 83, pp. 434-441.
Yang S, Zhu S, Hong R. Graphene Oxide/Polyaniline Nanocomposites Used in Anticorrosive Coatings for Environmental Protection. Coatings. 2020; 10(12):1215.
Qingqing Zhang, Yu Li, Yiyu Feng, Wei Feng, Electropolymerization of graphene oxide/polyaniline composite for high-performance supercapacitor, Electrochimica Acta, vol. 90, 2013, pp. 95-100, ISSN 0013-4686.

* cited by examiner

*Primary Examiner* — Elizabeth D Wood
(74) *Attorney, Agent, or Firm* — NKL Law; Byungwoong Park

(57) ABSTRACT

A method for preparing an adsorbent for a skin aging diagnosis based on a body odor volatile marker according to an embodiment of the present disclosure comprises: forming a graphene oxide;polyaniline (GO;PANI) compound layer through an electrochemical polymerization reaction of an electrolyte including graphene oxide and an aniline monomer; forming a graphene oxide;polyaniline/zinc oxide nanorods (GO;PANI/ZNRs) composite layer by growing zinc oxide nanorods on the GO;PANI compound layer; and forming a graphene oxide;polyaniline/zinc oxide nanorods/ zeolitic imidazolate framework-8 (GO;PANI/ZNRs/ZIF-8) composite layer by reacting the GO;PANI/ZNRs composite layer with a 2-methylimidazole (2-MI) solution.

8 Claims, 14 Drawing Sheets

S100

S110

Prepare electrolyte including graphene oxide and aniline monomer

S120

Coat working electrode with graphene oxide;polyaniline compound layer

Dip stainless steel wire coated with GO;PANI/ZNRs in 2-methylimidazole (2-MI) solution

S320

React stainless steel wire in oven of 60~110°C for 30 minutes to 48 hours

FIG. 8

ADSORBENT FOR SKIN AGING DIAGNOSIS BASED ON BODY ODOR VOLATILE MARKER AND METHOD FOR PREPARING SAME

CROSS REFERENCE TO RELATED APPLICATION

This application is a continuation of PCT/KR2021/011183 filed Aug. 23, 2021, which claims priority to Korea Patent Applications No. 10-2021-0061725 filed on May 13, 2021 and No. 10-2021-0110179 filed on Aug. 20, 2021, which are hereby incorporated by reference in its entirety.

BACKGROUND

1. Field of Technology

The present disclosure relates to an adsorbent for a skin aging diagnosis based on a body odor volatile marker and a method for preparing the same, and more specifically, to an adsorbent used for a body odor analysis and a method for preparing the same.

2. Related Technology

An existing method usually used for a body odor analysis, a solid phase micro extraction (SPME) method has a problem in being applied directly to a human skin. For example, when the solid phase micro extraction (SPME) method is applied to a human skin, since an adsorbent is exposed to an external environment, the adsorbent may easily be damaged.

In order to remedy such a problem of the solid phase micro extraction (SPME) method, an in-needle micro extraction (INME) method is being used. However, in order that the in-needle micro extraction (INME) method can easily be applied, an adsorbent capable of adsorbing both polar substances and non-polar substances is required.

The discussions in this section are only to provide background information and do not constitute an admission of prior art.

SUMMARY

An aspect of the present disclosure for solving such a problem is to provide an adsorbent capable of adsorbing both polar substances and non-polar substances and a method for preparing the same.

To this end, according to the present disclosure, a method for preparing an adsorbent for a skin aging diagnosis based on a body odor volatile marker comprises: forming a graphene oxide;polyaniline (GO;PANI) compound layer through an electrochemical polymerization reaction of an electrolyte including graphene oxide and an aniline monomer; forming a graphene oxide;polyaniline/zinc oxide nanorods (GO;PANI/ZNRs) composite layer by growing zinc oxide nanorods on the GO;PANI compound layer; and forming a graphene oxide;polyaniline/zinc oxide nanorods/zeolitic imidazolate framework-8 (GO;PANI/ZNRs/ZIF-8) composite layer by reacting the GO;PANI/ZNRs composite layer with a 2-methylimidazole (2-MI) solution.

Here, forming a GO;PANI compound layer comprises preparing an electrolyte including graphene oxide and an aniline monomer; and coating a working electrode with the graphene oxide;polyaniline compound layer through an electrochemical polymerization reaction of the aniline monomer in the electrolyte.

Coating a working electrode comprises dipping a stainless-steel wire working electrode, a Pt counter electrode, an Ag/AgCl reference electrode in the electrolyte and repeatedly supplying a voltage of 0.6~1.0V at a rate of 25~50 mV/s in 25~35 cycles.

Forming a GO;PANI/ZNRs composite layer comprises a first dipping to dip a stainless steel wire coated with GO;PANI in a mixed solution including zinc nitrate hexahydrate and hexamethylenetetramine; drying of the stainless steel wire after the first dipping; a second dipping to dip the dried stainless steel wire in the mixed solution including zinc nitrate hexahydrate and hexamethylenetetramine; and a heat treatment on the stainless steel wire after the second dipping.

The first dipping and the drying are performed at least one or more times.

The drying is performed in an oven of 110~273° C. for one minute or more.

The heat treatment is performed in an oven of 60~100° C. for 1~4 hours.

Forming a GO;PANI/ZNRs/ZIF-8 composite layer comprises dipping a stainless steel wire coated with GO;PANI/ZNRs in a 2-methylimidazole (2-MI) solution; and reacting the stainless steel wire in an oven of 60~110° C. for 30 minutes to 48 hours after dipping.

A content of the graphene oxide is more than 0 weight % and less than or equal to 8 weight %, a content of the aniline monomer is in a range of 18~74 weight %, and a content of the 2-MI solution is in a range of 25~77 weight %.

An adsorbent for a skin aging diagnosis based on a body odor volatile marker according to the present disclosure for achieving the above-described purport is prepared in any one of the above-described methods.

According to the present disclosure, an adsorbent capable of adsorbing both polar substances and non-polar substances may be provided. In addition, the present disclosure may provide an adsorbent with a volatile marker significantly improved in its adsorption amount. Since the adsorption amount is improved, a high reproducibility may be secured in a process of an odor analysis.

However, effects, that an adsorbent for a skin aging diagnosis based on a body odor volatile marker and a method for preparing the same according to embodiments of the present disclosure would have, will not be limited to the above-described effects and other effects, which were not previously described, will be clearly understood by a person with ordinary knowledges in a technical field, to which the present disclosure pertains, from the below descriptions.

BRIEF DESCRIPTION OF THE DRAWINGS

In order that the disclosure may be well understood, there will now be described various forms thereof, given by way of example, reference being made to the accompanying drawings, in which:

FIG. 2 is a flow diagram specifically illustrating S100 in FIG. 1;

FIG. 8 is a flow diagram specifically illustrating S300 of FIG. 1;

DETAILED DESCRIPTION OF EMBODIMENTS

Hereinafter, preferred embodiments of the present disclosure will be described. However, it should be noted that the embodiments of the present disclosure may be modified in various forms and the technological ideas of the present disclosure are not limited to these embodiments. In addition, the embodiments of the present disclosure are provided for completely teaching the present disclosure to a person with ordinary knowledge in the art to which the present disclosure pertains.

Terms used in this specification are used only for describing specific examples. Accordingly, a term in a singular form may also mean a term in a plural form unless a component with the term needs to be singular in the light of the context. In addition, it should be noted that terms such as 'comprise', 'include', etc. are to exactly indicate the existence of the described characteristics, numbers, steps, operations, components, parts or their combinations, but are not to preliminarily exclude the existence of other characteristics, numbers, steps, operations, components, parts or their combinations.

If there is no other definition, all the terms used in this specification have meanings that can be commonly understood by persons with ordinary skill in the art to which the present disclosure pertains. In addition, terms shall not be excessively ideally or perfunctorily interpreted if they are not clearly and particularly defined as such. In this specification, a term in a singular form may also mean a term in a plural form as long as there is no particular indication.

Expressions such as 'about or approximately', 'substantially', or the like are intended to have meanings close to numerical values or ranges when allowable errors in unique manufactures or substances are presented and intended to prevent accurate or absolute numerical values disclosed for understanding of the present invention from being illegally or unfairly used by any unconscionable third party.

Figure 1:
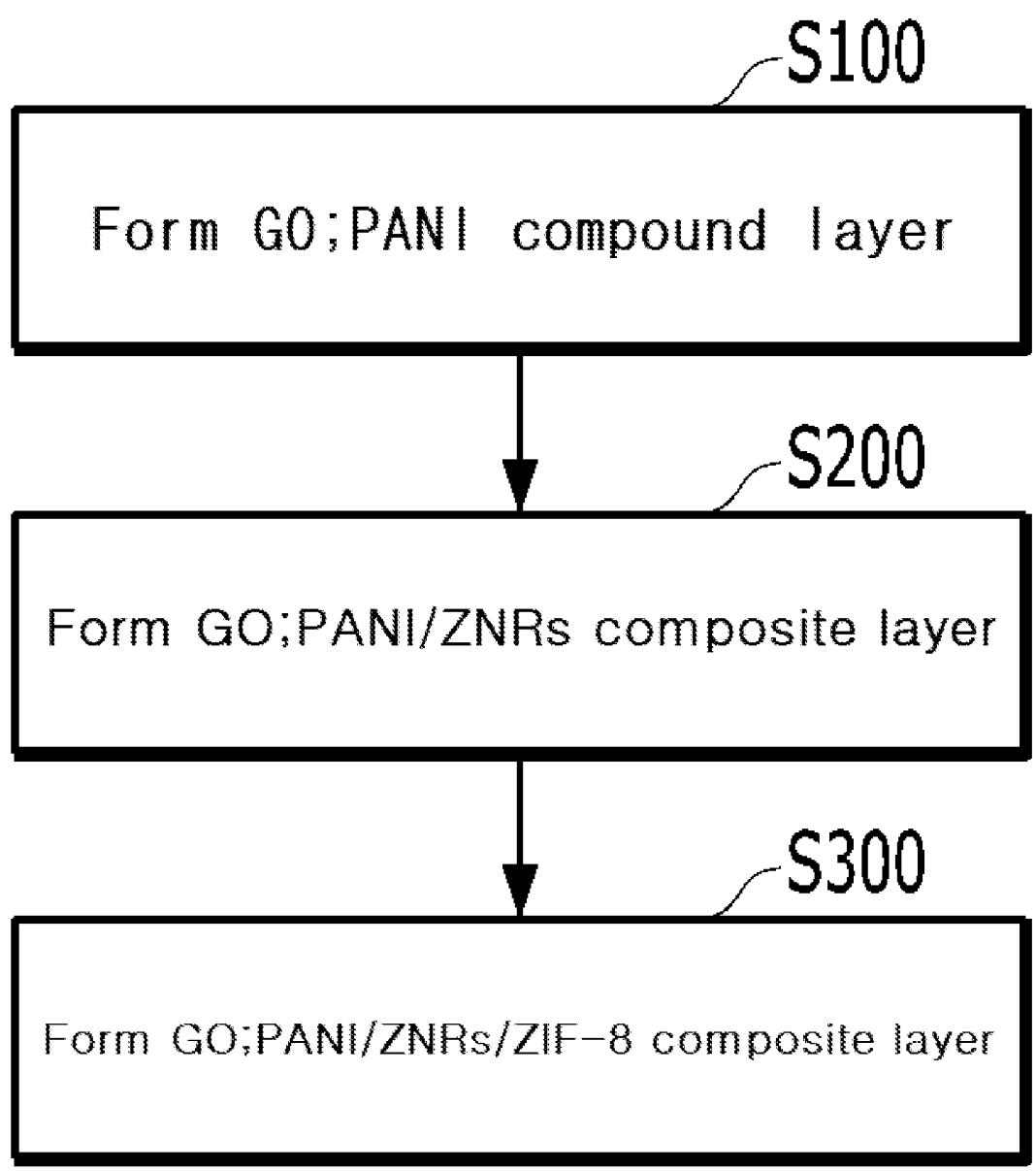
FIG. 1 is a flow diagram illustrating a method for preparing an adsorbent for a skin aging diagnosis based on a body odor volatile according to an embodiment of the present disclosure.

FIG. 1 is a flow diagram illustrating a method for preparing an adsorbent for a skin aging diagnosis based on a body odor volatile according to an embodiment of the present disclosure.

Referring to FIG. 1, a method for preparing an adsorbent for a skin aging diagnosis based on a body odor volatile marker according to an embodiment of the present disclosure may comprise forming a graphene oxide;polyaniline (GO;PANI) compound layer (S100), forming a graphene oxide;polyaniline/zinc oxide nanorods (GO;PANI/ZNRs) composite layer (S200), and forming a graphene oxide;polyaniline/zinc oxide nanorods/zeolitic imidazolate framework-8 (GO;PANI/ZNRs/ZIF-8) composite layer (S300). Each process will be described below in detail.

S100 may be forming a graphene oxide;polyaniline (GO;PANI) compound layer through an electrochemical polymerization reaction of an electrolyte including graphene oxide and an aniline monomer. FIG. 2 is a flow diagram specifically illustrating S100 in FIG. 1.

Referring to FIG. 2, S100 may comprise preparing an electrolyte including graphene oxide and an aniline monomer (S110) and coating a working electrode with a graphene oxide;polyaniline (GO;PANI) compound layer (S120).

S110 may be preparing an electrolyte for forming a GO;PANI compound layer. As an embodiment, preparing an electrolyte may comprise adding graphene oxide (GO) in a solvent of 0.5 M of sulfuric acid, causing an exfoliation of graphene oxide (GO) by performing a sonication for about 3 hours, adding aniline, and causing a bonding of graphene oxide (GO) and aniline by additionally performing a sonication for about 1 hour.

As an embodiment, in preparing an electrolyte, a multiwall carbon nanotube (MWCNT) may be used as a substitute for graphene oxide (GO). Since a multiwall carbon nanotube (MWCNT) has a large surface area, it may facilitate adsorption and contribute to enhancing thermal stability. As another embodiment, in preparing an electrolyte, graphene formed by deoxidation of graphene oxide (GO) may be used as a substitute for graphene oxide (GO). Use of graphene may enhance stability of conductive polymers.

Meanwhile, as an embodiment, for graphene oxide;polyaniline (GO;PANI) formed by the bonding of graphene oxide (GO) and aniline, polypyrrole may be used as a substitute for polyaniline (PANT). Since the polypyrrole is a polymer having conductivity, it has an advantage that electropolymerization is possible by an oxidation reaction of a cyclic voltammetry (CV) method.

As another embodiment, for graphene oxide;polyaniline (GO;PANI) formed by the bonding of graphene oxide (GO) and aniline, poly(3,4-ethylenedioxythiophene) (PEDOT) may be used as a substitute for polyaniline (PANT). The PEDOT, which is a polymer having conductivity like polyaniline or polypyrrole, is less expensive and has a high energy density. The PEDOT may be formed by electropolymerization.

S120 may be coating a working electrode with a graphene oxide;polyaniline (GO;PANI) compound layer through an electrochemical polymerization reaction of an aniline monomer included in the electrolyte prepared in S110. As an embodiment, a cyclic voltammetry (CV) method may be used for coating a stainless steel wire with a graphene oxide;polyaniline (GO;PANI) layer. For example, the coating may be a process of dipping a stainless-steel wire, a Pt counter electrode, an Ag/AgCl reference electrode in an electrolyte of 8 mL and repeatedly supplying a voltage of 0.6~1.0V at a rate of 25~50 mV/s in 25~35 cycles. Then, an electropolymerization of aniline is performed to coat the stainless steel wire with graphene oxide;polyaniline (GO;PANI).

Removing unreacted substances by running distilled water over the stainless steel wire coated with graphene oxide;polyaniline (GO;PANI) and drying the wire in an oven of 80° C. for 30 minutes may additionally be performed.

Figure 3:
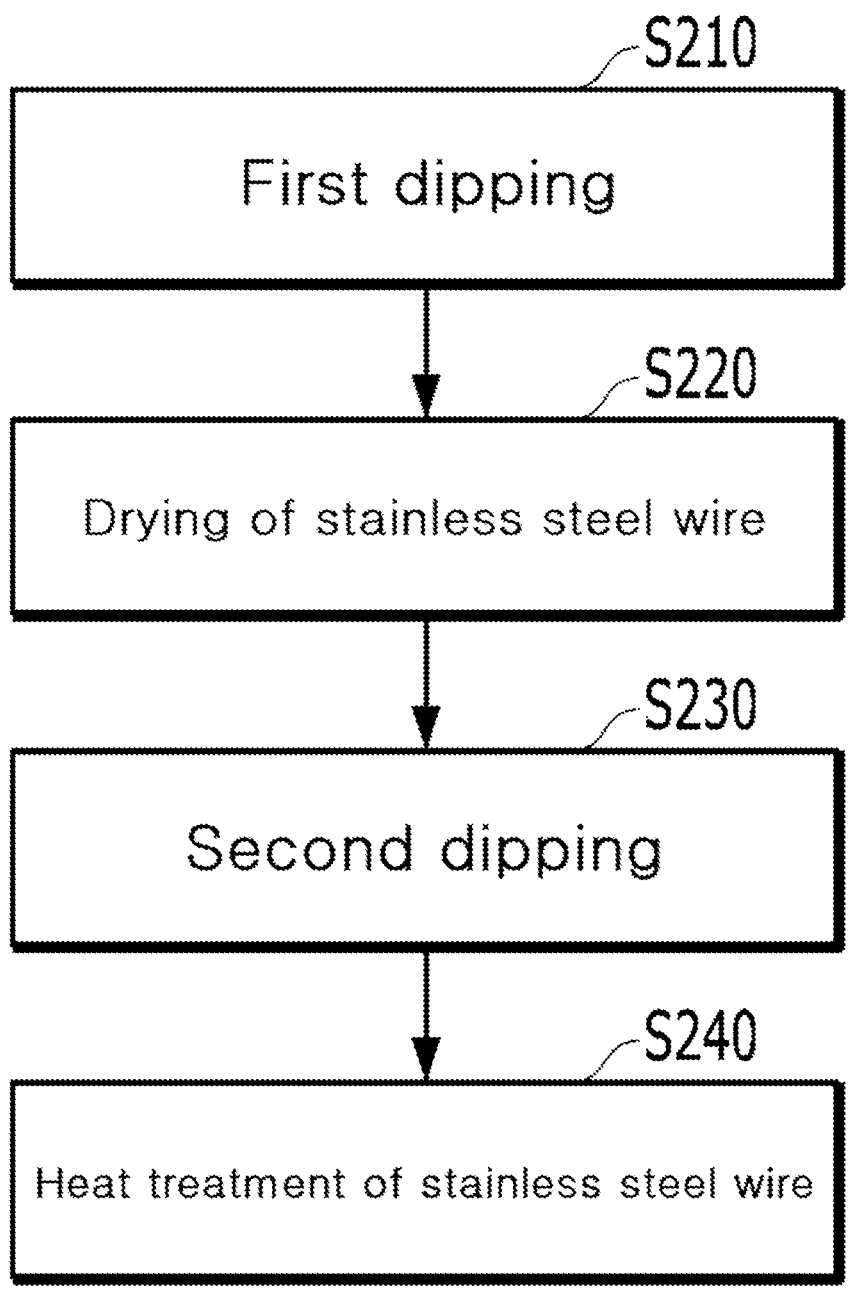
FIG. 3 is a flow diagram specifically illustrating S200 in FIG. 1.

Referring again to FIG. 1, S200 may be forming a graphene oxide;polyaniline/zinc oxide nanorods (GO;PANI/ZNRs) composite layer by growing zinc oxide nanorods on the graphene oxide;polyaniline (GO;PANI) compound layer formed in S100. FIG. 3 is a flow diagram specifically illustrating S200 in FIG. 1. Referring to FIG. 3, S200 may comprise a first dipping (S210), drying of the stainless-steel wire (S220), a second dipping (S230), and a heat treatment on the stainless steel wire (S240).

S210 may be a first dipping to dip a stainless steel wire coated with graphene oxide;polyaniline (GO;PANI) in a mixed solution including zinc nitrate hexahydrate and hexamethylenetetramine. As an embodiment, the first dipping may be a process of dipping for 30 seconds a wire coated with graphene oxide;polyaniline (GO;PANI) in a mixed solution of 0.5 mL including 0.3~0.7 M of zinc nitrate hexahydrate and hexamethylenetetramine.

Here, when the concentration of the mixed solution of zinc nitrate hexahydrate and hexamethylenetetramine is less than 0.3M, isopropyl palmitate, which is one of 5 target substances, is not adsorbed. On the contrary, when the concentration of the mixed solution is higher than 0.7M, the amount of zinc nitrate hexahydrate and hexamethylenetetramine, which are substances to be added, is considerably increased, and thus, they would not completely be dissolved. When considering the foregoing, in the first dipping, the concentration of the mixed solution of zinc nitrate hexahydrate and hexamethylenetetramine is preferably 0.3~0.7M. With the first dipping, ZnO seeds may be formed on the graphene oxide;polyaniline (GO;PANI) layer.

As an embodiment, in forming a graphene oxide;polyaniline/zinc oxide nanorods (GO;PANI/ZNRs) composite layer, zinc acetate may be used as a substitute of zinc nitrate hexahydrate.

Figure 4:
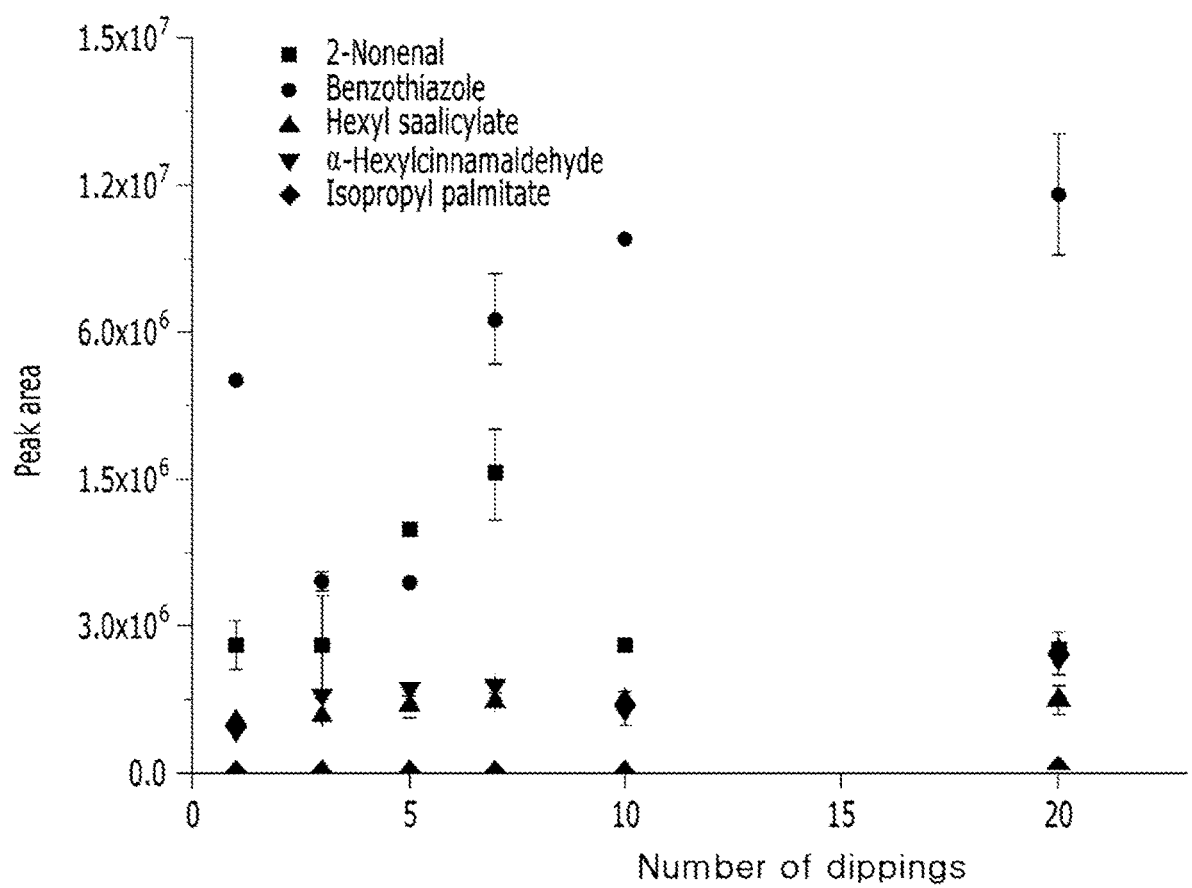
FIG. 4 is a graph showing rates of adsorption of target substances depending on the numbers of dippings in S210.

The first dipping of S210 may be repeatedly performed at least once. FIG. 4 is a graph showing rates of adsorption of target substances depending on the number of dippings in S210. Referring to FIG. 4, it can be verified that, when the dipping is performed one or more times, the adsorption of 5 target substances is smoothly proceeded.

Specifically, when repeatedly performing the dipping in the mixed solution of 0.5 M of zinc nitrate hexahydrate and hexamethylenetetramine for 30 seconds and the drying in an oven of 180° C. for 2 minutes and the number of the dipping is less than 1, it can be verified that the ZnO seeds are not generated. On the contrary, it can be verified that, when the dipping is performed one or more times, the adsorption rates for the 5 target substances are considerably increased. When considering this, the number of the dippings is preferably one or more.

Referring again to FIG. 3, S220 may be drying the stainless-steel wire after the first dipping in S210. As an embodiment, S220 may be drying the wire in an oven of 110~273° C. for 1 minute or more.

Figure 5:
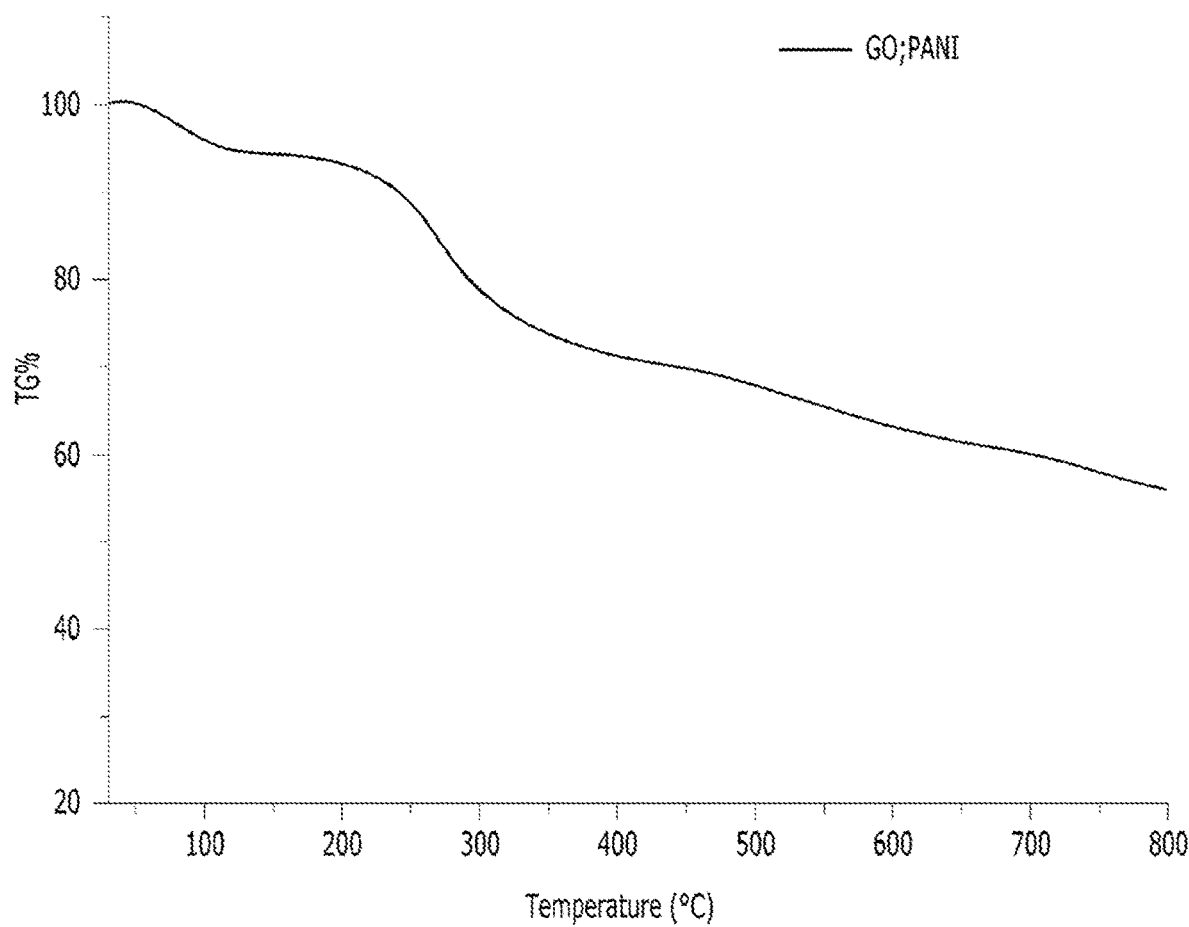
FIG. 5 is a graph illustrating a thermal gravimetric analysis (TGA) of graphene oxide;polyaniline (GO;PANI) depending on drying temperatures in S210.

Here, when the temperature for drying the stainless-steel wire is lower than 110° C., the solution on the wire is not completely dried. On the contrary, when the temperature for drying the stainless steel wire is higher than 273° C., the mass of graphene oxide;polyaniline (GO;PANI) is changed. FIG. 5 is a graph illustrating a thermal gravimetric analysis (TGA) of graphene oxide;polyaniline (GO;PANI) depending on drying temperatures in S210. Referring to FIG. 5, it can be verified that the mass of graphene oxide;polyaniline (GO;PANI) is considerably changed at around 273° C. When considering this, it is preferable that the drying temperature is 110~273° C.

In addition, when the drying time is less than 1 minute, the drying may not be completely performed. When considering this, when drying, the drying time may be restricted to one or more minutes. Meanwhile, the drying of S220 may be performed at least once.

Referring again to FIG. 3, S230 may be a second dipping to dip the stainless-steel wire dried in S220 in the mixed solution including zinc nitrate hexahydrate and hexamethylenetetramine. As an embodiment, the second dipping may be a dipping of the stainless-steel wire dried in S220 in the mixed solution including 0.03~0.07 M of zinc nitrate hexahydrate and a hexamethylenetetramine.

Here, when the concentration of the mixed solution of zinc nitrate hexahydrate and hexamethylenetetramine is less than 0.03M, isopropyl palmitate, which is one of 5 target substances, is not smoothly adsorbed. On the contrary, when the concentration of the mixed solution is higher than 0.07M, the zinc oxide nanorods (ZNRs) are grown to have irregular and considerable sizes, and thus, they might not be inputted in a needle. When considering the foregoing, the concentration of the mixed solution of zinc nitrate hexahydrate and hexamethylenetetramine is preferably 0.03~0.07M.

S240 may be performing a heat treatment of the stainless-steel wire after the second dipping of S230. As an embodiment, the heat treatment may be performed in an oven of 60~100° C. for 1~4 hours.

Figure 6:
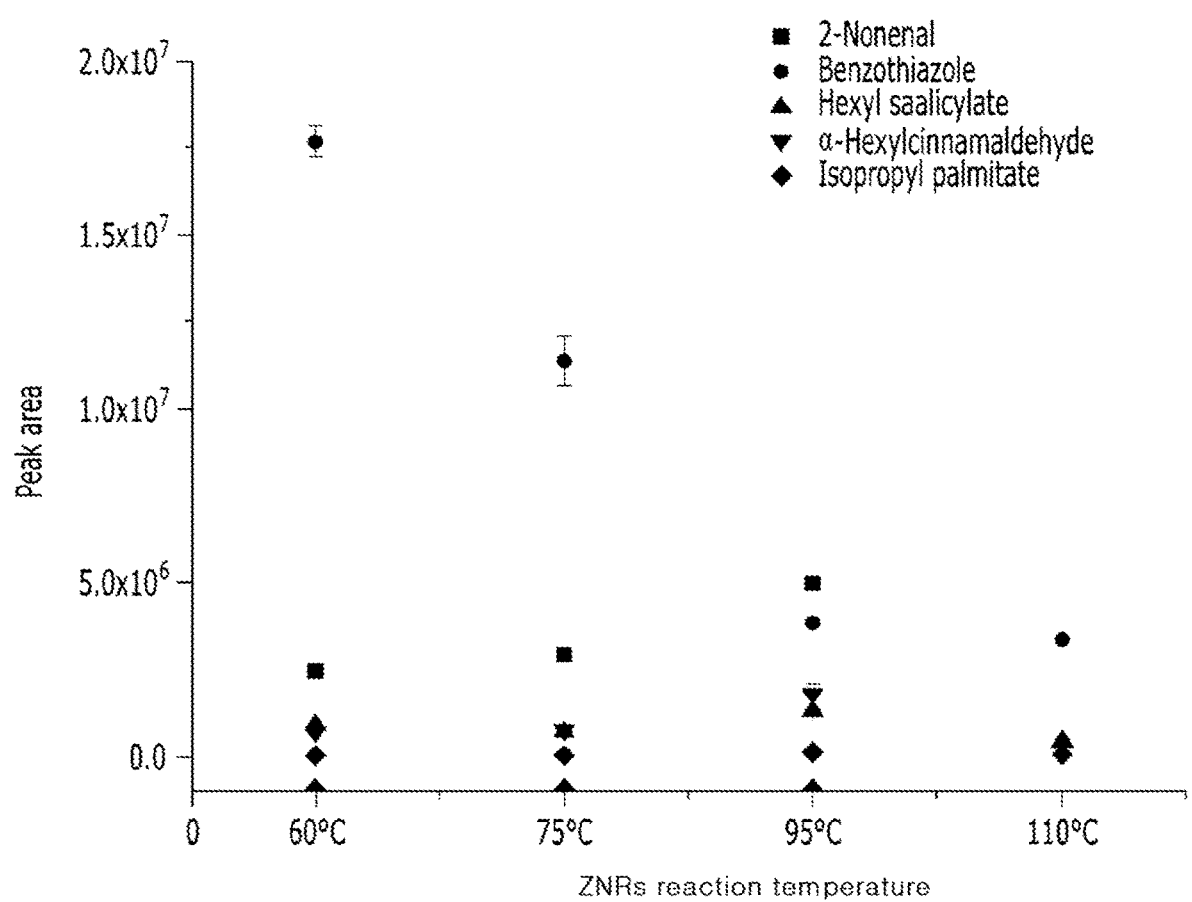
FIG. 6 is a graph showing adsorption amounts of target substances depending on reaction temperatures in S240.

Here, when the reaction temperature is lower than 60° C., the adsorption amounts of target substances are sharply decreased. On the contrary, when the reaction temperature is higher than 100° C., the adsorption amounts of 5 target substances are considerably reduced. FIG. 6 is a graph showing adsorption amounts of target substances depending on reaction temperatures in S240. Referring to FIG. 6, it can be verified that, when the reaction temperature is higher than 100° C., the adsorption amounts of 5 target substances are considerably reduced. When considering this, it is preferable that the reaction temperature in the heat treatment is 60~100° C.

In addition, when the reaction time is less than 1 hour, the adsorption amounts of 5 target substances are considerably reduced. When the reaction time is less than 1 hour, zinc oxide (ZnO) present on the surface of the graphene oxide;polyaniline (GO;PANI) layer is not sufficiently grown to be zinc oxide nanorods (ZNRs). In this case, since zinc oxide nanorods (ZNRs), which are used as a zinc source in a reaction for producing zeolitic imidazolate framework-8 (ZIF-8), are insufficient, zeolitic imidazolate framework-8 (ZIF-8) might not be sufficiently formed, and this leads to decreases of the adsorption amounts. On the contrary, when the reaction time is more than 4 hours, the adsorption amounts of 2-nonenal, hexylsalicylate, and α-hexylcinnamaldehyde among 5 target substances are considerably reduced.

Figure 7:
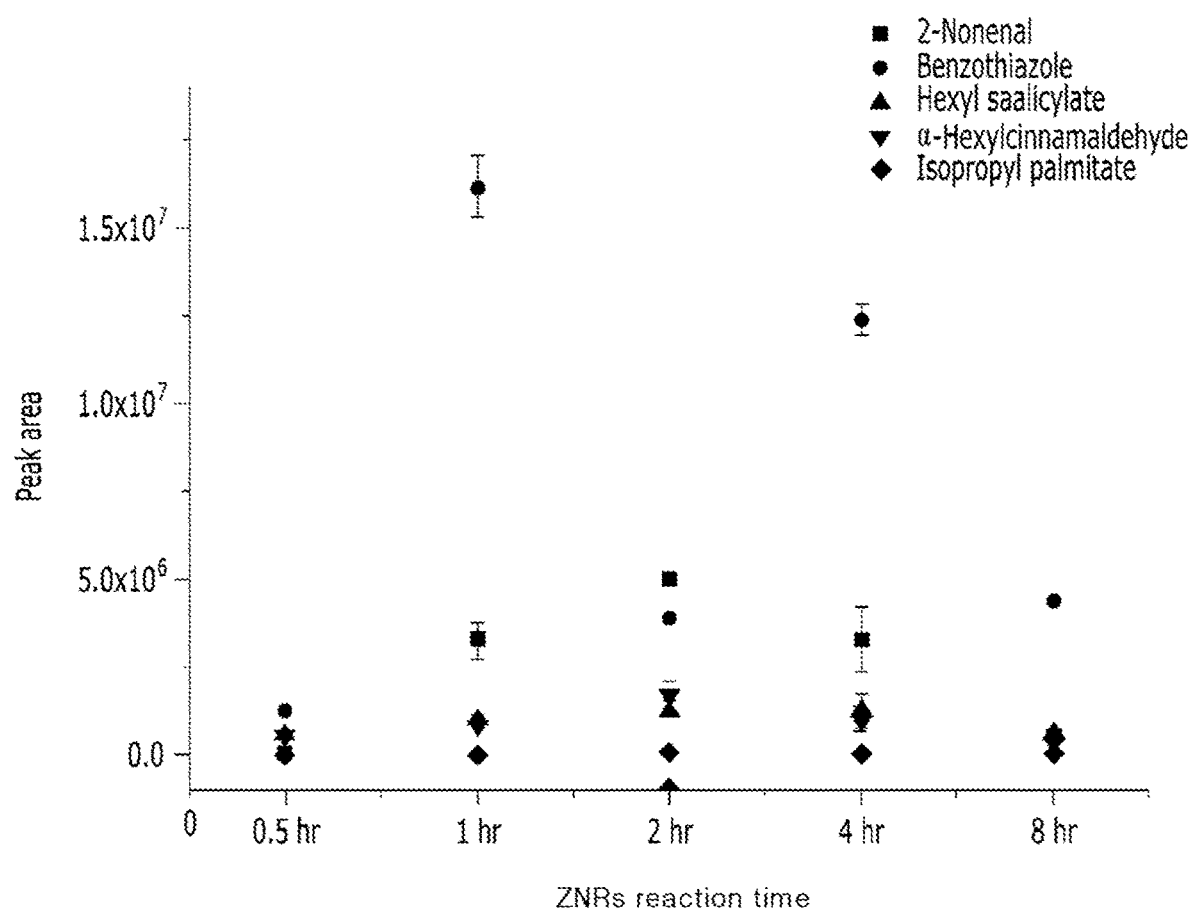
FIG. 7 is a graph showing adsorption amounts of target substances depending on reaction times in S240.

FIG. 7 is a graph showing adsorption amounts of target substances depending on reaction times in S240. Referring to FIG. 7, it can be verified that, when the reaction time is less than 1 hour or more than 4 hours, the adsorption amounts of 5 target substances are considerably reduced. When considering this, the reaction time is preferably 1~4 hours. With the above-described processes, zinc oxide seeds formed in the graphene oxide;polyaniline (GO;PANI) layer may be grown in a form of nanorods.

Referring again to FIG. 1, S300 may be forming a graphene oxide;polyaniline/zinc oxide nanorods/zeolitic imidazolate framework-8 (GO;PANI/ZNRs/ZIF-8) composite layer by reacting the GO;PANI/ZNRs composite layer with a 2-methylimidazole (2-MI) solution.

FIG. 8 is a flow diagram specifically illustrating S300 of FIG. 1. Referring to FIG. 8, S300 may comprise dipping the stainless steel wire coated with graphene oxide;polyaniline/zinc oxide nanorods (GO;PANI/ZNRs) in a 2-methylimidazole (2-MI) solution (S310) and reacting the stainless steel wire in an oven of 60~110° C. for 30 minutes to 48 hours (S320). As an embodiment, the 2-methylimidazole (2-MI) solution may be prepared by adding 2-methylimidazole (2-MI) in a solution including dimethylformamide (DMF) and water at a ratio of 3:1.

Figure 9:
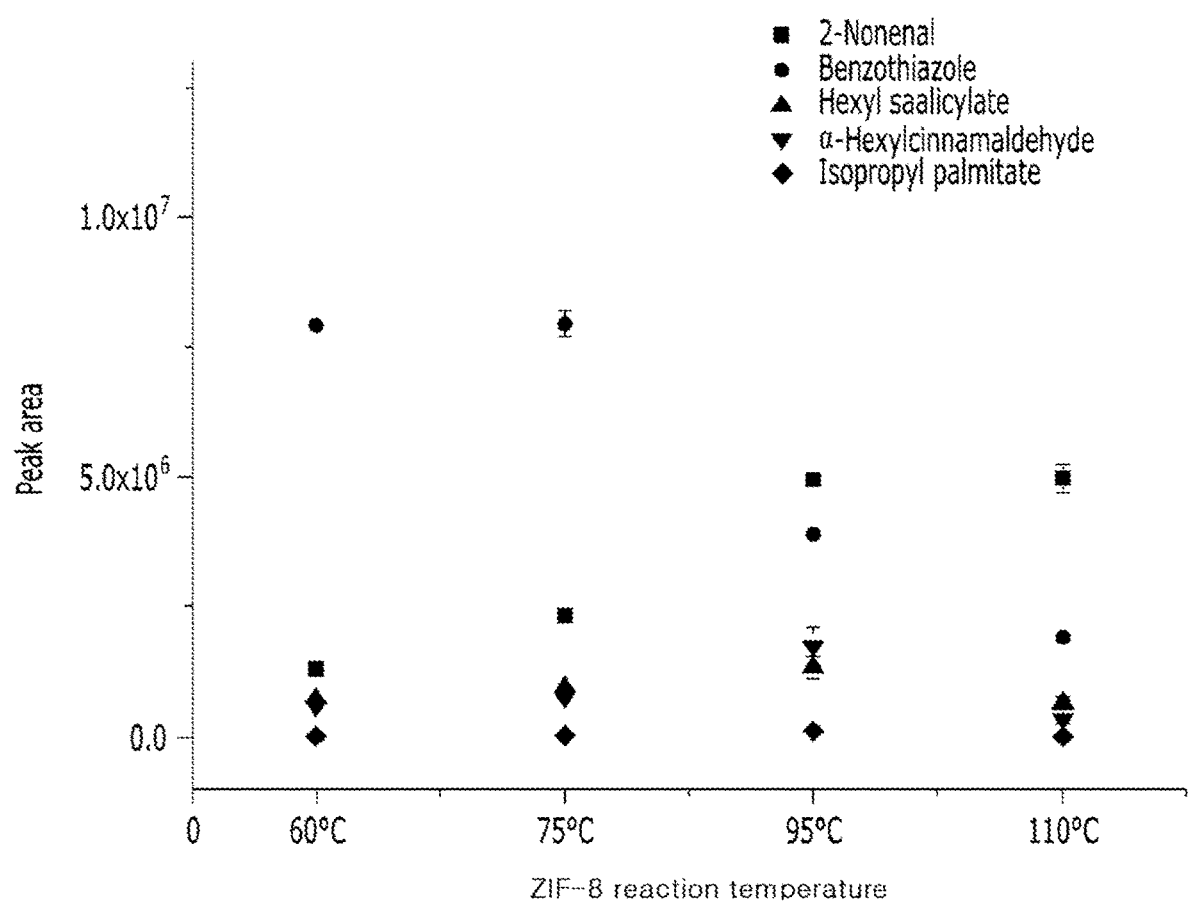
FIG. 9 is a graph showing adsorption amounts of target substances depending on reaction temperatures in S320.

Here, when the reaction temperature is lower than 60° C., the adsorption amounts of target substances are sharply decreased. On the contrary, when the reaction temperature is higher than 110° C., the adsorption amount of isopropyl palmitate among 5 target substances tends to be considerably reduced. FIG. 9 is a graph showing adsorption amounts of target substances depending on reaction temperatures in S320. Referring to FIG. 9, it can be verified that, when the reaction temperature is higher than 110° C., the adsorption amount of isopropyl palmitate among 5 target substances tends to be considerably reduced. When considering this, the reaction temperature is preferably 60~110° C.

Figure 10:
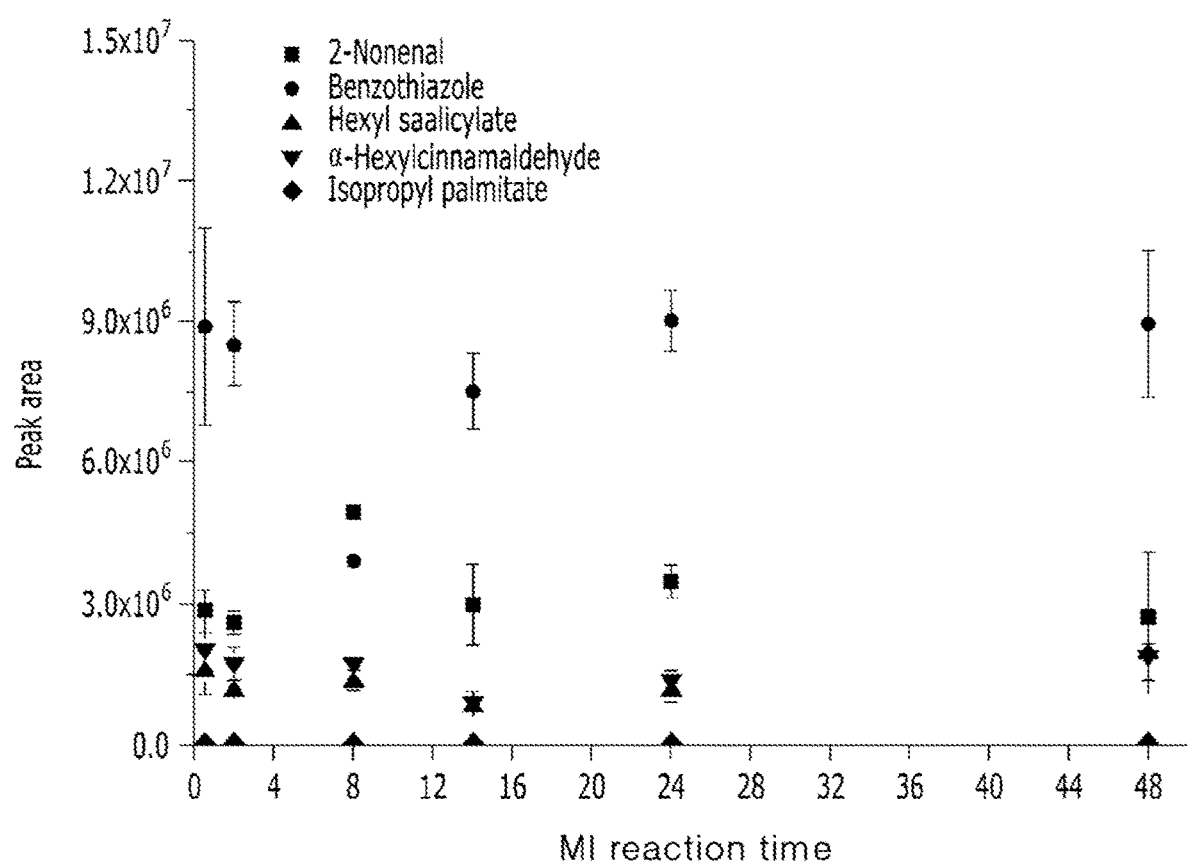
FIG. 10 is a graph showing adsorption amounts of target substances depending on reaction times in S320.

In addition, when the reaction time is less than 0 hour, in other word, when the reaction with 2-methylimidazole (2-MI) has not been made, zeolitic imidazolate framework-8 (ZIF-8) is not formed. Therefore, the reaction time needs to be more than 0 hour. However, when the reaction with 2-methylimidazole (2-MI) is performed for more than 48 hours, the 2-methylimidazole (2-MI) solution is evaporated. FIG. 10 is a graph showing adsorption amounts of target substances depending on reaction times in S320. Referring to FIG. 10, it can be verified that, when the reaction time is 30 minutes to 48 hours, the adsorption amounts of 5 target substances are considerably high. When considering this, the reaction time is preferably 30 minutes to 48 hours. With the above-described processes, zeolitic imidazolate framework-8 (ZIF-8) may be formed, through the reaction of Zn' and 2-methylimidazole (2-MI), on the surface coated with graphene oxide;polyaniline/zinc oxide nanorods (GO;PANI/ZNRs).

As an embodiment, 1,4-Benzodicarboxylic acid may be used as a substitute for 2-methylimidazole (2-MI). In this case, metal-organic framework (MOF)-5 may be formed by using 1,4-Benzodicarboxylic acid, which is a ligand, and having zinc as a center metal.

As another embodiment, 4,4',4"-Benzene-1,3,5-triyl-tribenzoic acid may be used as a substitute for 2-methylimidazole (2-MI). In this case, MOF-177 may be formed by using 4,4',4"-benzene-1,3,5-triyl-tri-benzoic acid, which is a ligand, and having zinc as a center metal.

As still another embodiment, 1,4-Benzodicarboxylic acid may be used as a substitute for 2-methylimidazole (2-MI). In this case, UiO-66 may be formed by using 1,4-Benzodicarboxylic acid, which is a ligand, and having zinc as a center metal.

As still another embodiment, benzimidazole may be used as a substitute for 2-methylimidazole (2-MI). In this case, ZIF-7 may be formed by using benzimidazole, which is a ligand, and having zinc as a center metal.

As still another embodiment, 2-Imidazolate carboxaldehyde may be used as a substitute for 2-methylimidazole (2-MI). In this case, ZIF-90 may be formed by using 2-Imidazolate carboxaldehyde, which is a ligand, and having zinc as a center metal.

As still another embodiment, 4,4'-(Hexafluoroiso-propylidene) bis (benzoic acid) may be used as a substitute for 2-methylimidazole (2-MI). In this case, Zn-FMOF may be formed by using 4,4'-(Hexafluoroiso-propylidene) bis (benzoic acid), which is a ligand, and having zinc as a center metal.

For a method for preparing an adsorbent for skin aging diagnosis based on a body odor volatile marker, a content of the graphene oxide (GO) is more than 0 weight % and less than or equal to 8 weight %, a content of the aniline monomer is in a range of 18~74 weight %, and a content of the 2-methylimidazole (2-MI) solution is in a range of 2577 weight %.

When more than 8 weight % of graphene oxide (GO) is added in the electrolyte, precipitation occurs. When considering this, the content of graphene oxide (GO) is preferably more than 0 and less than or equal to 8 weight %.

When less than 18 weight % of aniline is added in the electrolyte, the electropolymerization to be polyaniline (PANT) is hardly performed. In addition, when more than 74 weight % of aniline is added in the electrolyte, the coating with the graphene oxide;polyaniline becomes thick, and thus, the insertion into a needle is impossible. When considering this, the content of an aniline monomer is preferably 18 weight %~74 weight %.

When more than 77 weight % of 2-methylimidazole (2-MI) is added in the electrolyte, it is not dissolved in a solvent including dimethylformamide (DMF) and water at a ratio of 3:1. In addition, when less than 25 weight % of 2-methylimidazole (2-MI) is added in the electrolyte, a detection error for 5 target substances is higher than 10%. When considering this, the content of 2-methylimidazole (2-MI) is preferably 25 weight %~77 weight %.

In order that the present disclosure is more clearly understood, embodiments and comparative examples are described below. However, the below descriptions are only examples for the present disclosure and its effects. The scope of the present disclosure and its effect will not be necessarily limited thereto.

Embodiment 1: By using an electrolyte prepared by adding 0.8 mg of graphene oxide (GO) and 73.6 mg of aniline in 8 mL of 0.5 M of sulfuric acid, the coating with graphene oxide;polyaniline (GO;PANI) is made. In forming zinc oxide (ZnO) seeds, the wire is coated with graphene oxide;polyaniline/zinc oxide nanorods (GO;PANI/ZNRs) by performing 5 times a process of dipping the wire in a mixed solution including 0.5 M of zinc nitrate hexahydrate and hexamethylenetetramine for 30 seconds and drying the wire in an oven of 180° C. Then, an adsorbent of graphene oxide;polyaniline/zinc oxide nanorods/zeolitic imidazolate framework-8 (GO;PANI/ZNRs/ZIF-8) is formed by reacting the GO;PANI/ZNRs composite layer for 8 hours in a solution prepared by adding 51.3 mg of 2-methylimidazole (2-MI) in a solvent of 0.5 mL including dimethylformamide (DMF) and water at a ratio of 3:1 and its adsorption amount is verified. Here, the length of the adsorbent is 1 cm.

Embodiment 2: An adsorbent is prepared in the same method as that for embodiment 1, except for the amount of graphene oxide (GO), which is adjusted to be 16 mg.

Embodiment 3: An adsorbent is prepared in the same method as that for embodiment 1, except for the amounts of graphene oxide (GO) and aniline, which are respectively adjusted to be 8 mg and 154 mg.

Embodiment 4: An adsorbent is prepared in the same method as that for embodiment 1, except for the amounts of graphene oxide (GO) and 2-methylimidazole (2-MI), which are respectively adjusted to be 8 mg and 154 mg.

Embodiment 5: An adsorbent is prepared in the same method as that for embodiment 1, except for the amounts of graphene oxide (GO), aniline, and 2-methylimidazole (2-MI), which are respectively adjusted to be 12 mg, 154 mg, and 103 mg.

Embodiment 6: An adsorbent is prepared in the same method as that for embodiment 1, except for the amounts of graphene oxide (GO) and aniline, which are respectively adjusted to be 8 mg and 36.8 mg.

Comparative example 1: An adsorbent is prepared in the same method as that for embodiment 1, but without graphene oxide (GO).

Comparative example 2: An adsorbent is prepared in the same method as that for embodiment 1, except for the amounts of graphene oxide (GO), aniline, and 2-methylimidazole (2-MI), which are respectively adjusted to be 8 mg, 154 mg, and 5.13 mg.

The contents of the elements in embodiments 1~6 and comparative examples 1~2 are as in table 1.

TABLE 1

| Classification | GO content (weight %) | Aniline content (weight %) | 2-MI content (weight %) |
|---|---|---|---|
| Comparative example 1 | 0 (0%) | 73.6 mg (36.8%) | 51.3 mg (25.6%) |
| Comparative example 2 | 8 mg (4.0%) | 154 mg (73.6%) | 5.13 mg (2.56%) |
| Embodiment 1 | 0.8 mg (0.4%) | 73.6 mg (36.8%) | 51.3 mg (25.6%) |
| Embodiment 2 | 16 mg (8.0%) | 73.6 mg (36.8%) | 51.3 mg (25.6%) |
| Embodiment 3 | 8 mg (4.0%) | 154 mg (73.6%) | 51.3 mg (25.6%) |
| Embodiment 4 | 8 mg (4.0%) | 73.6 mg (36.8%) | 154 mg (76.9%) |
| Embodiment 5 | 12 mg (6.0%) | 154 mg (73.6%) | 103 mg (51.2%) |
| Embodiment 6 | 8 mg (4.0%) | 36.8 mg (18.4%) | 51.3 mg (25.6%) |

Figure 11:
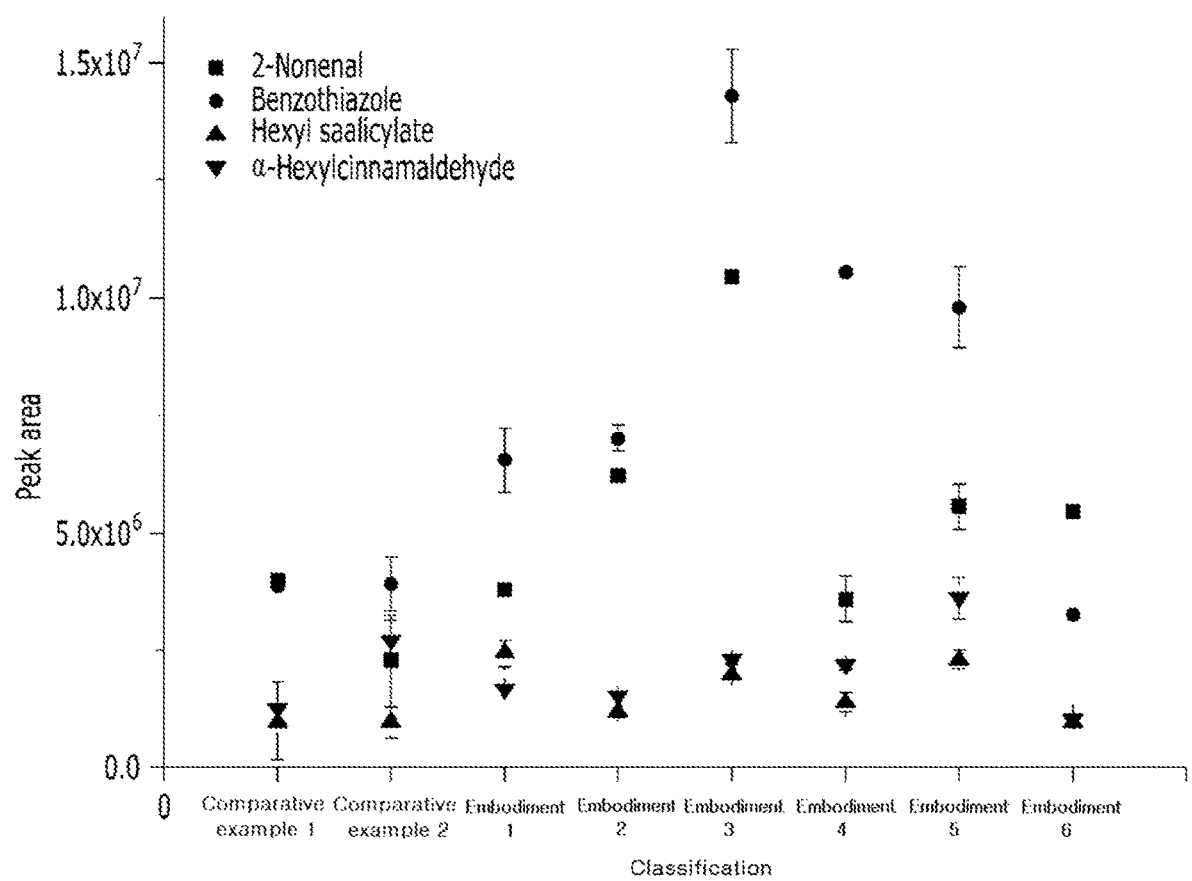
FIG. 11 and FIG. 12 are graphs illustrating adsorption amounts of target substances depending on ratios of reactants.
Figure 12:
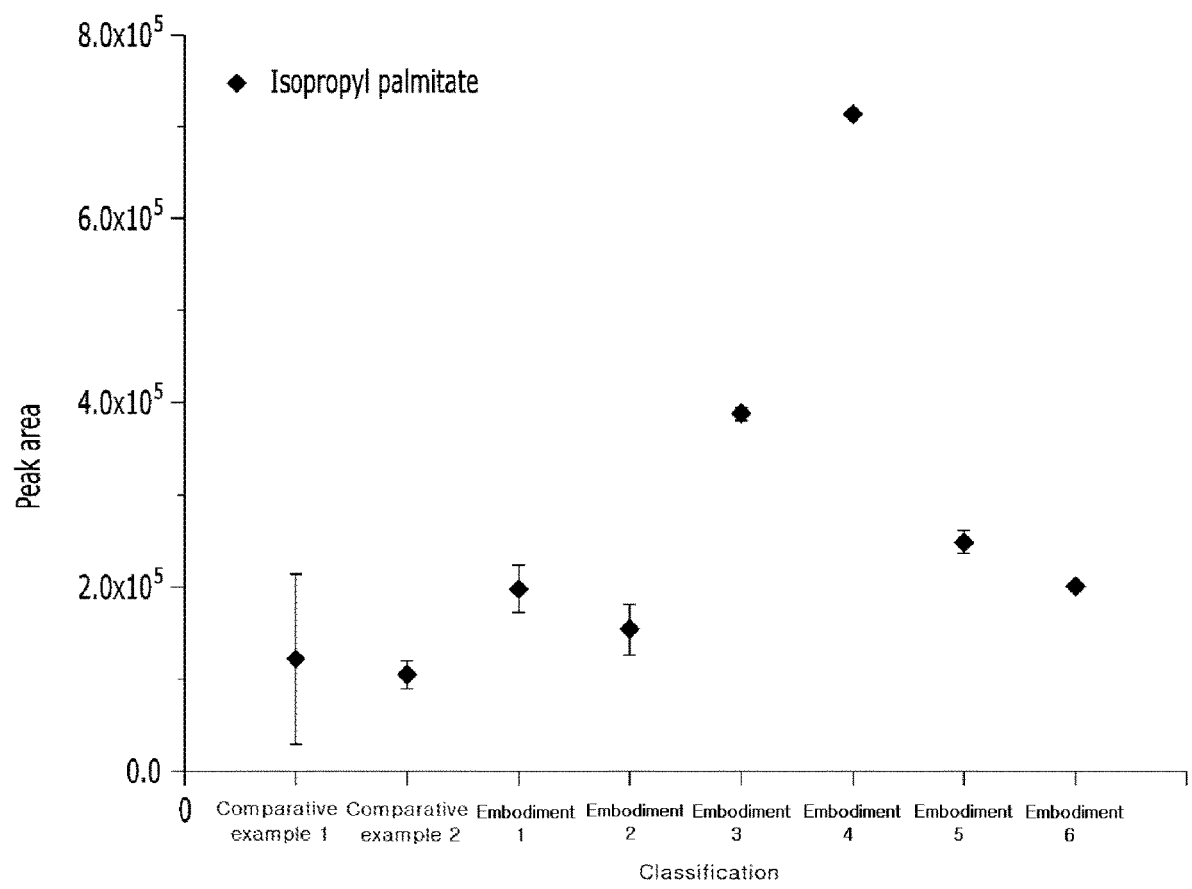
Figure 13:
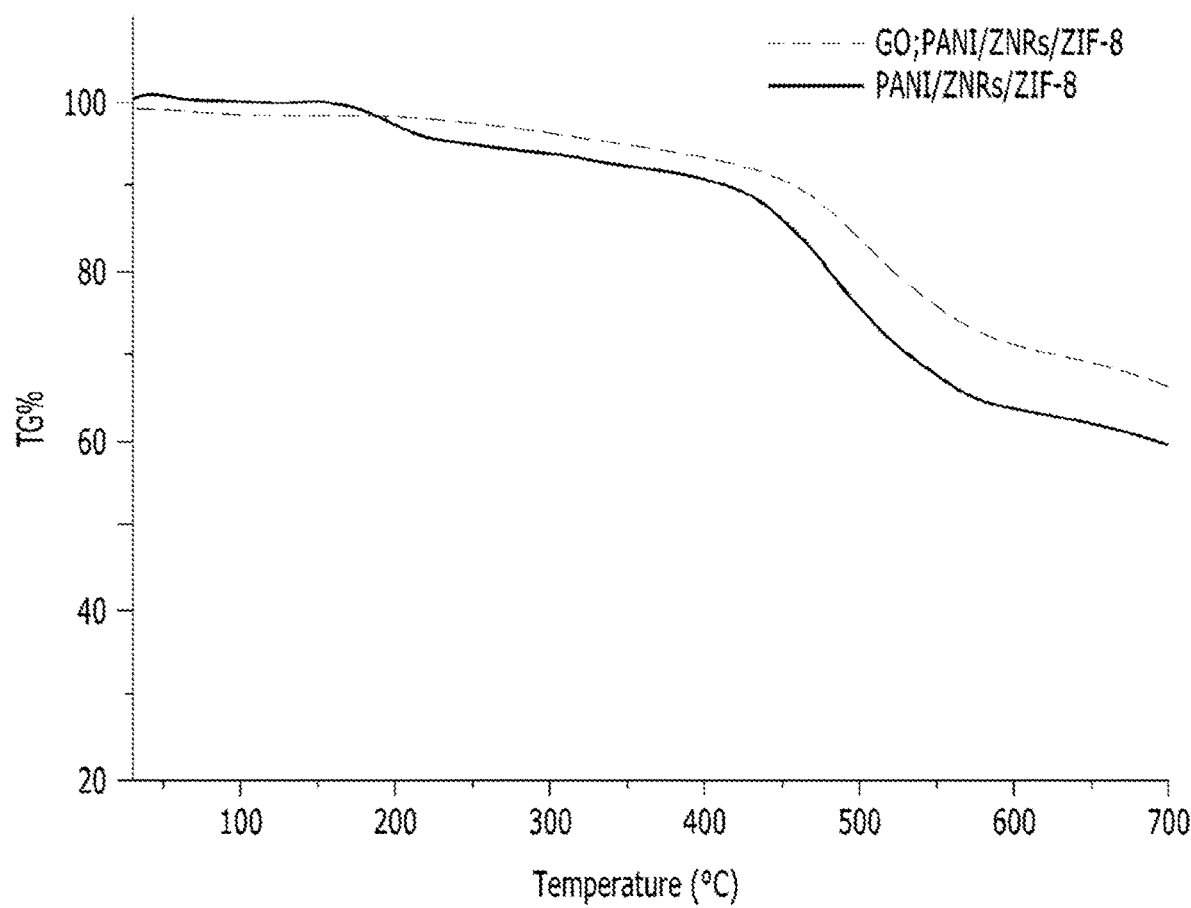
FIG. 13 is a graph illustrating a thermal gravimetric analysis (TGA) of an adsorbent depending on whether graphene oxide is added or not.

FIG. 11 and FIG. 12 are graphs illustrating adsorption amounts of target substances depending on ratios of reactants and FIG. 13 is a graph illustrating a thermal gravimetric analysis (TGA) of an adsorbent depending on whether graphene oxide is added or not.

Referring to FIG. 11 to FIG. 13, when comparing adsorbents of embodiments 1~6, formed to include graphene oxide (GO), aniline, and 2-methylimidazole (2-MI) respectively in ranges of more than 0 weight % and less than or equal to 8 weight %, 18 weight %~74 weight %, and 25 weight %~77 weight %, with an adsorbent of comparative example 1 formed without graphene oxide (GO), it can be verified that, in embodiments 1~6, the adsorption amounts of benzothiazole, hexyl salicylate, α-hexyl cinnamaldehyde, and isopropyl palmitate increase.

In addition, it can be verified through the thermal gravimetric analysis (TGA) that adding graphene oxide (GO) further enhances thermal stability. In the thermal gravimetric analysis (TGA), it can be verified that an adsorbent formed without graphene oxide (GO) is changed in its mass at 195° C., whereas no change in the mass is observed in an adsorbent, formed by adding graphene oxide (GO), until 291° C.

When comparing comparative example 2 with embodiments 1~6, it can be verified that, according to comparative example 2, the detection error of 5 body odor volatile markers is higher than 10%, which means that the detection error increases and the detection amount of 2-nonenal decreases.

According to embodiment 3 in which an adsorbent is formed by adding an increased amount of aniline, the adsorption amounts of all of 5 body odor volatile markers tend to increase. The reason may be that the amount of generated polyaniline (PANT) increases as the amount of aniline increases, and thus, π-π bonding between a target substance and polyaniline (PANT) increases. In conclusion, it can be verified that, when the contents of graphene oxide (GO), aniline, and 2-methylimidazole (2-MI) are respectively more than 0 weight % and less than or equal to 8 weight %, 18 weight %~74 weight %, and 25 weight %~77 weight %, the adsorption of 5 body odor volatile markers is excellent.

Figure 14:
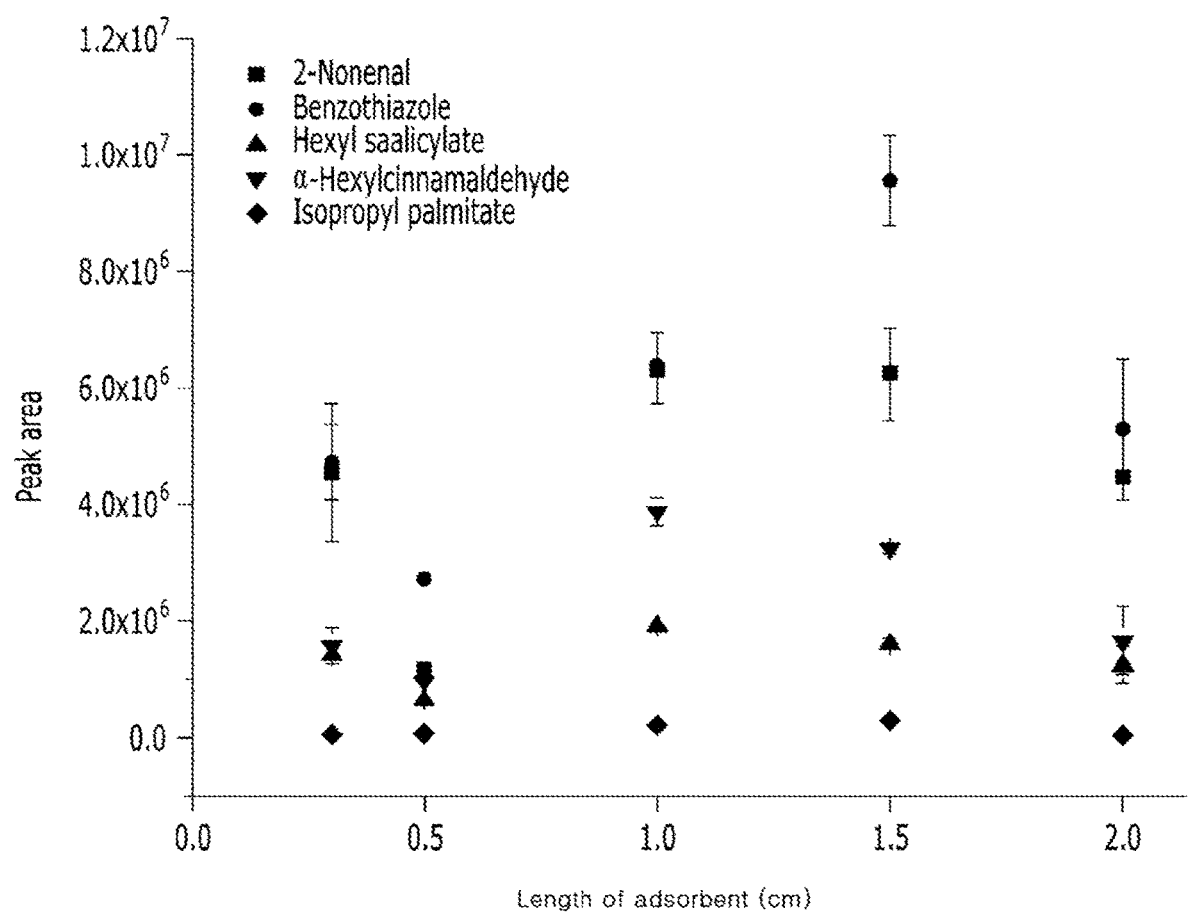
FIG. 14 is a graph showing comparison of adsorption amounts of target substances depending on the lengths of adsorbents.

An adsorbent for a skin aging diagnosis based on a body odor volatile marker according to the present disclosure may have a length of 0.3~2 cm. An adsorbent may be formed to have a maximum length of 2 cm and a minimum length of 0.3 cm in 8 mL of an electrolyte. FIG. 14 is a graph showing comparison of adsorption amounts of target substances depending on the lengths of adsorbents. Referring to FIG. 14, it can be verified that, when the length of an adsorbent is 0.3~2 cm, the adsorption of 5 target substances is smoothly proceeded. When considering this, the length of an adsorbent is preferably 0.3~2 cm.

Although preferred embodiments are illustrated and described in the above, the present disclosure is not limited to the above-described specific embodiments, but can be variously modified by any persons with ordinary knowledge in the technical field, to which the present disclosure pertains, without being beyond the purport of the claims. In addition, such modified embodiments should be understood to be in the scope of the purport of the claims.

What is claimed is:

1. A method for preparing an adsorbent for a skin aging diagnosis based on a body odor volatile marker comprising:
    forming a graphene oxide;polyaniline (GO;PANI) compound layer through an electrochemical polymerization reaction of an electrolyte including graphene oxide having a content of more than 0 weight % and less than or equal to 8 weight % and an aniline monomer having a content of 18~74 weight %;
    forming a graphene oxide;polyaniline/zinc oxide nanorods (GO;PANI/ZNRs) composite layer by growing zinc oxide nanorods on the GO;PANI compound layer; and
    forming a graphene oxide;polyaniline/zinc oxide nanorods/zeolitic imidazolate framework-8 (GO;PANI/ZNRs/ZIF-8) composite layer by reacting the GO;PANI/ZNRs composite layer with a 2-methylimidazole (2-MI) solution having a content of 25~77 weight %.

2. The method of claim 1, wherein forming a GO;PANI compound layer comprises:
    preparing an electrolyte including graphene oxide and an aniline monomer; and
    coating a working electrode with the graphene oxide;polyaniline compound layer through an electrochemical polymerization reaction of the aniline monomer in the electrolyte.

3. The method of claim 2, wherein coating a working electrode comprises:
    dipping a stainless-steel wire working electrode, a Pt counter electrode, an Ag/AgCl reference electrode in the electrolyte; and
    repeatedly supplying a voltage of 0.6~1.0V at a rate of 25~50 mV/s in 25~35 cycles.

4. The method of claim 1, wherein forming a GO;PANI/ZNRs composite layer comprises:
    a first dipping to dip a stainless steel wire coated with GO;PANI in a mixed solution including zinc nitrate hexahydrate and hexamethylenetetramine;

drying of the stainless-steel wire after the first dipping;

a second dipping to dip the dried stainless-steel wire in the mixed solution including zinc nitrate hexahydrate and hexamethylenetetramine;

and a heat treatment on the stainless-steel wire after the second dipping.

5. The method of claim 4, wherein the first dipping and the drying are performed at least one or more times.

6. The method of claim 4, wherein the drying is performed in an oven of 110~273° C. for one minute or more.

7. The method of claim 4, wherein the heat treatment is performed in an oven of 60~100° C. for 1~4 hours.

8. The method of claim 1, wherein forming a GO;PANI/ZNRs/ZIF-8 composite layer comprises:

dipping a stainless steel wire coated with GO;PANI/ZNRs in a 2-methylimidazole (2-MI) solution; and reacting the stainless-steel wire in an oven of 60~110° C. for 30 minutes to 48 hours after dipping.

* * * * *